(12) United States Patent
Takahara et al.

(10) Patent No.: US 6,217,919 B1
(45) Date of Patent: Apr. 17, 2001

(54) PROCESS FOR THE PRODUCTION OF HOLLOW BAKED CONFECTIONERY

(75) Inventors: Mitsunori Takahara, Fujieda; Takashi Someda, Tokyo; Eiji Okaya, Omiya; Yutaka Kuwano, Takatsuki, all of (JP)

(73) Assignee: Meiji Seika Kaisha Ltd., Tokyo (JP)

( * ) Notice: Subject to any disclaimer, the term of this patent is extended or adjusted under 35 U.S.C. 154(b) by 0 days.

(21) Appl. No.: 09/403,798

(22) PCT Filed: May 27, 1998

(86) PCT No.: PCT/JP98/02325

§ 371 Date: Oct. 25, 1999

§ 102(e) Date: Oct. 25, 1999

(87) PCT Pub. No.: WO98/56258

PCT Pub. Date: Dec. 17, 1998

(30) Foreign Application Priority Data

Jun. 9, 1997 (JP) .................................................. 9-150945

(51) Int. Cl.[7] .............................. A23G 3/00; A21D 2/02; A21D 8/02; A21D 13/00
(52) U.S. Cl. ........................... 426/94; 426/281; 426/296; 426/446; 426/458; 426/502; 426/503; 426/621; 426/560
(58) Field of Search ............................. 426/94, 281, 293, 426/296, 560, 621, 446, 458, 502, 503

(56) References Cited

U.S. PATENT DOCUMENTS

| 4,209,536 | * | 6/1980 | Dugliotti | 426/94 |
|---|---|---|---|---|
| 4,613,508 | * | 9/1986 | Shishido | 426/281 |
| 4,752,493 | * | 6/1988 | Moriki | 426/559 |
| 5,000,968 | | 3/1991 | Szwerc et al. | 426/63 |
| 5,435,714 | * | 7/1995 | Van Lengerich et al. | 425/313 |
| 5,505,971 | | 4/1996 | Mochizuki et al. | 426/281 |
| 5,681,605 | | 10/1997 | Takemori et al. | 426/549 |
| 5,747,092 | * | 5/1998 | Carey et al. | 426/560 |

FOREIGN PATENT DOCUMENTS

| 58-170437 | 10/1983 | (JP) . |
|---|---|---|
| 61-185148 | 8/1986 | (JP) . |
| 2-150230 | 6/1990 | (JP) . |
| 6-209711 | 8/1994 | (JP) . |
| 7-274805 | 10/1995 | (JP) . |

* cited by examiner

*Primary Examiner*—Nina Bhat
(74) *Attorney, Agent, or Firm*—Frishauf, Holtz, Goodman, Langer & Chick, P.C.

(57) ABSTRACT

A method of making a hollow baked confectionery comprising forming a dough of a biscuit or a cracker capable of being formed into a sheet into a double sheet, shaping the dough by cutting, subjecting the dough to an alkali treatment, and baking, either without washing with water or after washing with water. The method provides a hollow baked confectionery having a substantially high inner space ratio and which has a desirable shape and is pleasurable to eat. The hollow space inside the baked confectionery is quite stable. Therefore, a material such as chocolate or the like can be filled in the hollow space in a larger amount than was previously possible.

16 Claims, No Drawings

PROCESS FOR THE PRODUCTION OF HOLLOW BAKED CONFECTIONERY

This application is a 35 U.S.C. 371 National Stage Application based on PCT/JP98/02325 filed on May 27, 1998.

BACKGROUND OF THE INVENTION

1. Technical Field

The present invention relates to a method of making a hollow baked confectionery. More specifically, the present invention relates to a method of making a hollow baked confectionery in which an inner space ratio is high, and a hollow structure is quite stable, so that it has characteristic features in its shape and its feeling upon eating. Further, the present invention provides a hollow baked confectionery obtained by the above-mentioned method.

2. Background Art

A hollow baked confectionery has been made by (1) a method in which baking is conducted using a dough obtained by converting starch into a α-starch, such as a chou pastry dough or the like, or (2) a method which comprises forming a dough of a biscuit, a cracker or the like into a single sheet or a double sheet using a sheet-forming machine, further shaping the sheet into a predetermined size or shape through cutting, and then baking the same.

When a hollow baked confectionery is made upon using a dough obtained by converting starch into α-starch, such as a chou pastry dough(former case), there is a difficulty that a step of converting starch into α-starch is required and the production line becomes intricate. There is still another difficulty that the hollow state of the resulting baked confectionery is unstable.

Meanwhile, when a hollow baked confectionery is made by a method which comprises forming a dough of a biscuit, a cracker or the like into a single sheet or a double sheet using a sheet-forming machine, further shaping the sheet into a predetermined size or shape by cutting, and then baking the same (latter case), since the dough tends to float between sheets compared to the single sheet, the inner hollow structure of the double sheet is easily stabilized. Accordingly, in order to obtain a product of which the inner space ratio is high and the structure is stable, the double sheet is used in many cases.

However, both of the single sheet and the double sheet have a defect that the inner steam pressure tends to leak out to reduce the inner space ratio. Accordingly, when the product is eaten in this form as such, there is a small difference in a feeling upon eating between this hollow baked confectionery and a baked confectionery which is not hollow, and the hollow shape does not provide a significant outstanding characteristic feature.

Further, also when a combination material such as a chocolate or the like is filled in a hollow baked confectionery obtained by forming a dough into a single sheet or a double sheet, further shaping the sheet into a predetermined size or shape by cutting and then baking the sheet as such, there are difficulties that the amount of the material filled is limited in the case of a low inner space ratio, so that the balance with the baked confectionery is limited and the variation has to be narrowed with respect to a flavor and a feeling upon eating.

SUMMARY OF THE INVENTION

The present invention has been made under the above-mentioned circumstances. An object of the present invention is firstly to provide a method of making a hollow baked confectionery in which an inner space ratio is quite high, and which hollow baked confectionery great characteristic features in the shape and the feeling upon eating.

An object of the present invention is secondly to provide a method of making a hollow baked confectionery in which a hollow structure inside the confectionery is quite stable and a combination material such as a chocolate or the like can be filled therein in a larger amount than before.

Further, an object of the present invention is thirdly to provide a method of making a hollow baked confectionery in which a degree of freedom in an amount of a material filled and in a combination of several different materials is widened and a variety of variation in a flavor and a feeling upon eating can be broadened.

Still further, an object of the present invention is to provide a hollow baked confectionery obtained by the above-mentioned method.

The present inventors have assiduously conducted investigations to solve the above-mentioned problems, and have found that a hollow baked confectionery of which the characteristics of the feeling upon eating and the shape are outstanding in comparison with those of the conventional hollow baked confectionery. The hollow baked confectionery according to the present invention is obtained by subjecting a dough formed into a double sheet to an alkali treatment before baking, and then baking the same. This finding has led to the completion of the present invention.

That is, the present invention provides a method of making a hollow baked confectionery, which comprises using a dough of a biscuit or a cracker capable of being formed into a sheet, forming said dough into a double sheet, shaping it by cutting, then subjecting said dough to an alkali treatment, and conducting baking either without washing with water or after washing with water.

Further, the present invention provides a hollow baked confectionery obtained by the above-mentioned method.

BEST MODE FOR CARRYING OUT THE INVENTION

The specific method and effects of the present invention are described below.

In the present invention, a dough of a biscuit or a cracker which can be formed into a sheet is used. As a starting material of the dough, a material which has been ordinarily used so far can be employed. As this dough, for example, a biscuit dough composed mainly of a wheat flour can be specifically mentioned.

In the present invention, a dough of a baked confectionery such as a biscuit or a cracker before baking is formed into a double sheet using a sheet-forming machine.

Subsequently, in the present invention, shaping by cutting with a roller cutter or the like is conducted.

The dough thus shaped through cutting is subjected to the alkali treatment. Specifically, the dough thus shaped by cutting is subjected to alkali treatment by being brought into contact with an alkaline solution by means of dipping, spraying or the like.

The greatest characteristic of the present invention lies in this alkali treatment. Unless the alkali treatment is conducted in the present invention, no desired effect can be obtained. Unless the alkali treatment is conducted in the present invention, the resulting baked confectionery has a hollow structure, but its state is unstable. Besides, the inner space ratio is low, and a non-uniform product is provided.

In the alkali treatment, the pH of the alkaline solution when it is brought into contact with the dough is preferably between 11.50 and 13.50 at room temperature. When the pH of the alkaline solution in contact with the dough is lower than 11.50, a shape having a high inner space ratio is not obtained. The product is not different from an untreated product, and no desired effect is obtained. Further, when the pH of the alkaline solution in contact with the dough is higher than 13.50, the hollow state is good, but the flavor is spoiled, making it impossible to obtain a product having satisfactory qualities.

In the adjustment of the pH of the alkaline solution used in the present invention, it is advisable to use an alkaline solution having an initial concentration of from 1.1 to 1.2% by weight by adjusting the pH to the above-mentioned range.

Further, in the alkali treatment, it is preferable that the temperature of the alkaline solution in contact with the dough is between 40° C. and 100° C. and below the boiling point of said solution. When the temperature of the alkaline solution in contact with the dough is less than 40° C., a shape having a high inner space ratio is not provided. There is no great difference with an untreated product, and no desired effect is provided.

Besides, in the alkali treatment, the contact time is preferably between 0.5 and 60 seconds when the dough is brought into contact with the alkaline solution. In case the contact time is shorter than 0.5 second when the dough is brought into contact with the alkali solution, there is no great difference with an untreated product, and no desired effect is provided. Further, in case the contact time exceeds 60 seconds when the dough is brought into contact with the alkaline solution, the hollow state is good, but the flavor is spoiled, and a product having satisfactory qualities is not obtained.

In the present invention, these conditions can be selected as required depending on the type of the dough used and qualities required in the final product.

As the alkaline solution to be used in the alkali treatment, a solution which is allowable as a food additive will do. For example, aqueous solutions of sodium hydroxide, sodium carbonate and the like are mentioned, and these can be selected as required.

In addition, in the present invention, the dough subjected to the alkali treatment as mentioned above is baked without being washed with water or after being washed with water.

That is, the dough subjected to the alkali treatment is baked with an oven either as such or after being washed with water using a shower or the like as required.

When washing with water is conducted here, the product can be finished with a soft feeling upon eating as compared with the case of not washing with water. Whether washing with water is conducted or not may be selected optionally depending on qualities of the final product required.

In this manner, the desired hollow baked confectionery can be made.

The baked confectionery provided by the present invention is, as mentioned above, a hollow baked confectionery having a high space ratio and characteristic features in the shape and the feeling upon eating by treating the surface of the dough, which is formed into a double sheet and cut, with the alkaline solution.

Further, in the baked confectionery provided by the present invention, the hollow portion is not divided into two or more chambers. The hollow structure inside the confectionery is quite stable, and the thickness of the swollen dough is constant. Consequently, a combination material such as a chocolate or the like can be filled therein in a large amount, and the characteristics of the combination material can be increased more than before. In addition, the variation of the flavor and the feeling upon eating can be broadened.

Still further, an apparatus required in the present invention includes, in addition to a conventional baked confectionery-making device, only a device for conducting an alkali treatment. Thus, it is quite simple and inexpensive.

The present invention is illustrated more specifically by referring to the following Examples. However, the present invention is not limited thereto.

The inner space ratio used in Examples refers to a ratio of an inner volume to a weight of a baked product, and it is expressed by a unit (cc/g).

EXAMPLE 1

A biscuit dough composed mainly of a wheat flour was formed into a double sheet using a sheet-forming machine, cut with a roller cutter, subjected to alkali treatment in an alkali bath filled with a sodium hydroxide solution having a pH of 11.50 and a solution temperature of 80° C. for 1 second, and then baked in a mesh oven to make a hollow baked confectionery.

In the resulting hollow baked confectionery, the hollow state was stable, the inner space ratio was as high as 2.0 (cc/g), the shape was characteristic, and the feeling upon eating was quite excellent.

EXAMPLE 2

A hollow baked confectionery was made in the same manner as in Example 1 except that a sodium hydroxide solution having a pH of 13.00 was used in the alkali treatment.

In the resulting hollow baked confectionery, the hollow state was stable, the inner space ratio was as high as 2.2 (cc/g), the shape was characteristic, and the feeling upon eating was quite excellent.

EXAMPLE 3

A hollow baked confectionery was made in the same manner as in Example 1 except that a sodium hydroxide solution having a pH of 12.00 was used in the alkali treatment and the dough after alkali treatment was washed with water using a shower.

In the resulting hollow baked confectionery, the hollow state was stable, the inner space ratio was as high as 2.0 (cc/g), the shape was characteristic, and the feeling upon eating was quite excellent.

EXAMPLE 4

A hollow baked confectionery was made in the same manner as in Example 3 except that a sodium hydroxide solution having a pH of 13.50 was used in the alkali treatment.

In the resulting hollow baked confectionery, the hollow state was stable, the inner space ratio was as high as 2.2 (cc/g), the shape was characteristic, and the feeling upon eating was quite excellent.

EXAMPLE 5

A hollow baked confectionery was made in the same manner as in Example 1 except that in the alkali treatment, the temperature of the sodium hydroxide solution was 40° C. and the treatment time was 60 seconds.

In the resulting hollow baked confectionery, the hollow state was stable, the inner space ratio was as high as 2.0 (cc/g), the shape was characteristic, and the feeling upon eating was quite excellent.

EXAMPLE 6

A hollow baked confectionery was made in the same manner as in Example 1 except that in the alkali treatment, the temperature of the sodium hydroxide solution was 60° C. and the treatment time was 5 seconds.

In the resulting hollow baked confectionery, the hollow state was stable, the inner space ratio was as high as 2.2 (cc/g), the shape was characteristic, and the feeling upon eating was quite excellent.

EXAMPLE 7

A hollow baked confectionery was made in the same manner as in Example 1 except that in the alkali treatment, the temperature of the sodium hydroxide solution was 100° C. and the treatment time was 0.5 second.

In the resulting hollow baked confectionery, the hollow state was stable, the inner space ratio was as high as 2.0 (cc/g), the shape was characteristic, and the feeling upon eating was quite excellent.

COMPARATIVE EXAMPLE 1

A hollow baked confectionery was made in the same manner as in Example 1 except that in the alkali treatment, a sodium hydroxide solution having a pH of 11.30 was used.

In the resulting hollow baked confectionery, the hollow state was stable, but the inner space ratio was 1.3 (cc/g), and it had the same shape and feeling upon eating as the conventional product which was made in the same manner as in Example 1 but without conducting an alkali treatment.

COMPARATIVE EXAMPLE 2

A hollow baked confectionery was made in the same manner as in Example 3 except that in the alkali treatment, a sodium hydroxide solution having a pH of 13.60 was used.

In the resulting hollow baked confectionery, the hollow state was stable, the inner space ratio was 2.2 (cc/g), and the shape was characteristic, but the flavor was notably spoiled, and no satisfactory qualities were provided.

COMPARATIVE EXAMPLE 3

A hollow baked confectionery was made in the same manner as in Example 1 except that in the alkali treatment, the temperature of the sodium hydroxide solution was 35° C. and the treatment time was 60 seconds.

In the resulting hollow baked confectionery, the hollow state was stable, but the inner space ratio was 1.4 (cc/g), and it had the same shape and feeling upon eating as the conventional product which was made in the same manner as in Example 1 but without conducting an alkali treatment.

COMPARATIVE EXAMPLE 4

A hollow baked confectionery was made in the same manner as in Example 1 except that in the alkali treatment, the temperature of the sodium hydroxide solution was 60° C. and the treatment time was 75 seconds.

In the resulting hollow baked confectionery, the hollow state was stable, the inner space ratio was 2.2 (cc/g), and the shape was characteristic, but the flavor was notably spoiled, and no satisfactory qualities were provided.

COMPARATIVE EXAMPLE 5

A biscuit dough composed mainly of a wheat flour was formed into a double sheet using a sheet-forming machine, cut with a roller cutter, and then baked in a mesh oven to make a hollow baked confectionery.

The resulting hollow baked confectionery had a hollow state. However, the state was unstable, the inner space ratio was between 1.0 and 1.4 (cc/g), and the degree of swelling was extremely small. Thus, it was non-uniform.

In accordance with the present invention, a hollow baked confectionery can be made which has quite a high inner space ratio and which has great characteristics in its shape and its feeling upon eating.

Further, in the baked confectionery provided by the present invention, the hollow portion is not divided into two or more chambers, the hollow structure inside the confectionery is quite stable, and the thickness of the swollen dough is constant. Therefore, a combination material such as a chocolate or the like can be filled therein in a larger amount than before.

Consequently, in accordance with the present invention, a degree of freedom in an amount of a material filled and in a combination of several different materials is widened and a width of variation in a flavor and a feeling upon eating can be broadened. Further, in accordance with the present invention, the characteristics of the combination material can be taken out more than before.

Still further, an apparatus required in the present invention includes, in addition to a conventional baked confectionery-making device, only a device for conducting an alkali treatment, and it is quite simple and inexpensive. Accordingly, there is no fear that a production line might be intricate and a cost might be increased.

INDUSTRIAL APPLICABILITY

The present invention can effectively be used in making a baked confectionery.

What is claimed is:

1. A method of making a hollow baked confectionery, which comprises providing a dough of a biscuit or a cracker capable of being formed into a sheet, forming said dough into a double sheet, shaping the dough by cutting, subjecting the dough to an alkaline treatment by bringing an alkaline solution into contact with the dough, and conducting baking, either without washing with water or after washing with water.

2. The method of making a hollow baked confectionery as claimed in claim 1, wherein when the alkaline solution is brought in to contact with the dough in then alkali treatment, the pH of said alkaline solution is in the range of from 11.50 to 13.50 at room temperature.

3. The method of making a hollow baked confectionery as claimed in claim 2, wherein when the alkaline solution is brought into contact with the dough in the alkali treatment, the temperature of said alkaline solution is between 40° C. and 100° C. and below the boiling point of said solution.

4. The method of making a hollow baked confectionery as claimed in claim 3, wherein in the alkali treatment, a contact time when the alkaline solution is brought into contact with the dough is in the range of from 0.5 to 60 seconds.

5. The method of making a hollow baked confectionery as claimed in claim 3, wherein the alkaline solution has an initial concentration of 1.1 to 1.2 weight % and the alkaline solution is selected from the group consisting of a sodium hydroxide solution and a sodium carbonate solution.

6. The method of making a hollow baked confectionery as claimed in claim 2, wherein in the alkali treatment, a contact time when the alkaline solution is brought into contact with the dough is in the range of from 0.5 to 60 seconds.

7. The method of making a hollow baked confectionery as claimed in claim 1, wherein when the alkaline solution is brought into contact with the dough in the alkali treatment, the temperature of said alkaline solution is between 40° C. and 100° C. and below the boiling point of said solution.

8. The method of making a hollow baked confectionery as claimed in claim 7, wherein in the alkali treatment, a contact time when the alkaline solution is brought into contact with the dough is in the range of from 0.5 to 60 seconds.

9. The method of making a hollow baked confectionery as claimed in claim 1, wherein in the alkali treatment, a contact time when the alkaline solution is brought into contact with the dough is in the range of from 0.5 to 60 second.

10. A hollow baked confectionery obtained by the method as claimed in claim 1.

11. The hollow baked confectionery as claimed in claim 10, wherein the hollow baked confectionery has an inner space ratio of 2.0 to 2.2 cc/g.

12. The method of making a hollow baked confectionery as claimed in claim 1, wherein the alkaline solution has an initial concentration of 1.1 to 1.2 weight %.

13. The method of making a hollow baked confectionery as claimed in claim 1, wherein the alkaline solution comprises sodium hydroxide.

14. The method of making a hollow baked confectionery as claimed as claim 1, wherein the alkaline solution comprises sodium carbonate.

15. The method of making a hollow baked confectionery as claimed in claim 1, wherein the alkaline solution is a sodium hydroxide solution having a pH of 11.5 and a solution temperature of 80° C.

16. The method of making a hollow baked confectionery as claimed in claim 1, wherein the alkaline solution is a sodium hydroxide solution having a pH of 13.0.

* * * * *